United States Patent

Furukawa

[11] Patent Number: 4,628,170
[45] Date of Patent: Dec. 9, 1986

[54] EDM USING TWO SEPARATE DIELECTRIC FLUIDS AND A SYSTEM FOR MAINTAINING SEGREGATION OF THE FLUIDS

[75] Inventor: Toshihiko Furukawa, Yamato, Japan

[73] Assignee: Sodick Co., Ltd., Kanagawa, Japan

[21] Appl. No.: 352,975

[22] Filed: Feb. 26, 1982

[30] Foreign Application Priority Data

Mar. 17, 1981 [JP] Japan ................ 56-037314

[51] Int. Cl.[4] ............ B23H 1/10; B23H 7/36; B01D 17/025
[52] U.S. Cl. ................ 219/69 D; 137/172; 137/563; 204/129.1; 210/126; 210/800; 210/805; 219/69 M
[58] Field of Search ............ 219/69 D, 69 M, 69 R; 204/129.6, 129.7, 220, 238, 129.75, 129.1; 137/172, 563; 210/122, 126, 800, 805

[56] References Cited

U.S. PATENT DOCUMENTS

| | | | |
|---|---|---|---|
| 1,897,240 | 2/1933 | Dahlgreen | 210/800 |
| 2,121,324 | 6/1938 | Manley | 137/172 |
| 2,192,094 | 2/1940 | Moore | 137/563 |
| 2,193,261 | 3/1940 | Thomson | 137/172 |
| 2,460,258 | 1/1949 | Jones | 210/800 |
| 2,896,657 | 7/1959 | Uhll et al. | 137/172 |
| 3,371,022 | 2/1968 | Inoue | 204/129.7 |
| 3,385,947 | 5/1968 | Inoue | 219/69 M |
| 3,396,846 | 8/1968 | Hamilton | 210/805 |
| 3,417,006 | 12/1968 | Inoue | 204/129.1 |
| 3,433,919 | 3/1969 | Braudeau et al. | 204/129.1 |
| 3,675,771 | 7/1972 | McKee | 210/800 |
| 3,742,974 | 7/1973 | Phillips | 137/172 |
| 3,757,813 | 9/1973 | Levenberg | 137/172 |
| 3,941,970 | 3/1976 | Grow | 219/69 M |
| 4,125,444 | 11/1978 | Inoue | 204/129.43 |
| 4,134,807 | 1/1979 | Briffod | 204/129.1 |
| 4,159,407 | 6/1979 | Wilkinson et al. | 219/69 D |
| 4,315,822 | 2/1982 | Jaisinghani | 210/805 |
| 4,317,019 | 2/1982 | Itoh | 219/69 D |

FOREIGN PATENT DOCUMENTS

| | | | |
|---|---|---|---|
| 2851482 | 5/1979 | Fed. Rep. of Germany | 204/129.75 |
| 1251271 | 3/1967 | Japan | 219/69 D |
| 5248163 | 10/1975 | Japan | 137/172 |
| 53-53745 | 11/1979 | Japan | 137/172 |
| 251723 | 7/1970 | U.S.S.R. | 204/129.75 |
| 779712 | 11/1980 | U.S.S.R. | 137/172 |

OTHER PUBLICATIONS

"The Role of the Dielectric Fluid in EDM", by Terry Hockenberry in ASE, pp. 1-9, Oct. 11, 1968.
"Fundamentals of the EDM Process", by Reda, in EDM Digest, pp. 12-17, in Mar./Apr. Issue 1980.

Primary Examiner—A. D. Pellinen
Assistant Examiner—Geoffrey S. Evans
Attorney, Agent, or Firm—James C. Wray

[57] ABSTRACT

In an electric discharge machining method, a workpiece is subjected to an electric discharge machining at a high working speed using water as the dielectric fluid, and after this, the workpiece is finish-machined using oil as the dielectric fluid. An apparatus for carrying out the method has a feeding system for selectively feeding water or oil as the quenched surface of a workpiece is removed by using water as a dielectric fluid in electric discharge machining (EDM) the dielectric fluid to a machining gap between the workpiece and a tool electrode and a returning device for selectively returning the dielectric fluid used in the machining gap to an oil tank or a water tank.

10 Claims, 9 Drawing Figures

EDM USING TWO SEPARATE DIELECTRIC FLUIDS AND A SYSTEM FOR MAINTAINING SEGREGATION OF THE FLUIDS

The present invention relates to a method and apparatus for electric discharge machining, and more particularly to a method and apparatus for electric discharge machining in which desired electric discharge machining can be precisely carried out at high speed.

As is well known, electric discharge machining is carried out with water or oil present in the gap between the electrode and the workpiece. In the case of using water, there is the advantage that the working speed is remarkably faster than in the case of using oil. For example, in the wire-cut electric discharge machining apparatus, although the upper limit of working speed is about 6 to 8 mm$^2$ per minute when the oil is used as the dielectric fluid, a working speed of 50 mm$^2$ per minute can be obtained when water is employed as the dielectric fluid. That is, when water is used as the dielectric fluid, the working speed is increased by about eight times over that obtained by the use of oil. However, when water is used, the machining of the workpiece from both surfaces, a phenomenon due to electrolytic action resulting from the low insulation property of the water, is especially pronounced at the corner portions. Because of this, corner definition is poor. As a result, use of water as the dielectric fluid gives less machining accuracy than in the case of using oil.

An object of the present invention is to provide an improved electric discharge machining method and appratus which are capable of obviating the disadvantages involved in the conventional electric discharge machining method and apparatus.

Another object of the present invention is to provide an electric discharge machining method and apparatus which are capable of machining a workpiece in any desired size with faster working speed.

Another object of the present invention is to provide an electric discharge machining method and appratus which are capable of precisely machining a workpiece at a high working speed.

Still another object of the present invention is to provide an electric discharge machining method and apparatus which are capable of easily quenching the machined surface of a workpiece at a high speed.

According to the present invention, there is provided an electric discharge machining method comprising a first step of electric discharge machining a workpiece at a high working speed using water as the dielectric fluid, a second step of changing the dielectric fluid from water to oil, and a third step of electric discharge machining the workpiece to finish-machine it. In the method of the present invention described above, it is possible to quench the surface of the workpiece during the finish-machining using oil, and after this, in order to remove the quenched surface to a depth corresponding to the roughness of the surface, to subject the workpiece to high-speed electric discharge machining using water as the dielectric fluid and utilizing the electrolytic action of the water. The working method mentioned above prevents the surface of the workpiece from being softened. Therefore, when the working method is applied to the manufacture of a metal mold, the life-time of the resulting metal mold will be remarkably extended.

The electric discharge machining apparatus of the present invention used for carrying out the above-mentioned method of electric discharge machining has an oil supplying system including an oil tank, an oil pump for pumping out the oil in the oil tank and an oil filter for filtering the oil supplied from the oil pump, a water supplying system including a water tank, a water pump for pumping out the water in the water tank and a water filter for filtering the water supplied from the water pump, a selector for supplying either water or oil as dielectric fluid by selecting either the oil supplying system or the water supplying system, and a device for selectively returning the dielectric fluid drained from a working tank to the water tank or the oil tank. The apparatus of the present invention may further comprise a device for returning the oil contained in the water tank to the oil tank and the water contained in the oil tank to the water tank. The returning device has a separating tank in which the mixture of water and oil is separated into water and oil by utilizing the difference in specific weight between water and oil.

Further objects and advantages of the invention will be clear from the following detailed description to be read in conjunction with the accompanying drawings in which.

Figure 1:
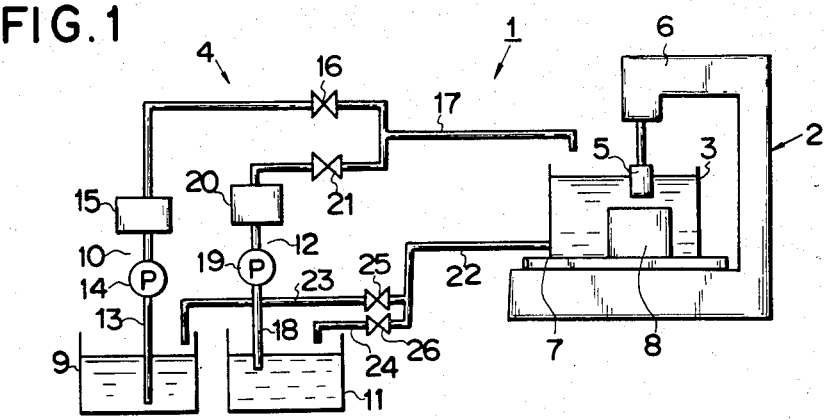
FIG. 1 is a schematic view of an embodiment of the electric discharge machining apparatus of the present invention.

FIG. 1 shows an embodiment of an electric discharge machining apparatus for use in carrying out the method of the present invention. An electric discharge machining apparatus 1 has an electric discharge machine 2 and a dielectric fluid feeding apparatus 4 for feeding dielectric fluid to a working tank 3 mounted on the electric discharge machine 2.

The electric discharge machine 2 is of the conventional type and has a head 6 to which a tool electrode 5 is attached and a working table 7 on which the working tank 3 is mounted. The tool electrode 5 can be moved in the vertical direction (Z direction) by a feeding device (not shown) provided in the head 6, and on the other hand the working table 7 is arranged so as to be able to move in a plane perpendicular to the feeding direction of the tool electrode 5, that is, in the X-Y plane.

The dielectric fluid feeding apparatus 4 is an apparatus for selectively feeding water or oil as a dielectirc fluid into the working tank 3 in which a workpiece 8 is set, and has a water feeding system 10 with a water tank 9 and an oil feeding system 12 with an oil tank 11. The water feeding system 10 comprises a feed-water pipe 13 having a feed-water pump 14 and a feed-water filter 15 and one end portion of the feed-water pipe 13 extends to near the bottom of the water tank 9. The water pumped out from the water tank 9 through the feed-water pipe 13 is filtered by the feed-water filter 15, and is then led through a solenoid valve 16 for feeding a water to a feed pipe 17 for dielectric fluid, one opening of which is directed into the working tank 3. The oil feeding system 12 comprises a feed-oil pipe 18 having a feed-oil pump 19 and a feed-oil filter 20 and one end opening of the feed-oil pipe 18 is positioned slightly under the oil surface in the oil tank 11. The oil pumped out through the feed-oil pipe 18 by the feed-oil pump 19 is led to the feed pipe 17 through a solenoid valve 21 for feeding oil after being filtered by the feed-oil filter 20. One end of a drain pipe 22 is connected with the lower portion of the working tank 3 and the other end is connected with a water-return pipe 23 communicating with the water tank 9 and a oil-return pipe 24 communicating with the oil tank 11. These pipes 23 and 24 have solenoid valves 25 and 26, respectively, and selectively opening the solenoid valve 25 or 26 causes the dielectric fluid (oil or water) in the working tank 3 to be selectively drained to either tank 9 or 11.

Therefore, when water is selected as the dielectric fluid, only the feed-water pump 14 is rendered operative, the solenoid valves 16 and 25 are opened, and the solenoid valves 21 and 26 are closed, so that only water is fed into the working tank 3 through the feed pipe 17 and the dielectric fluid in the working tank 3 can be drained into the water tank 9 through the drain pipe 22 and the water-return pipe 23. In this case, since the end portion of the feed-water pipe 13 extends to near the bottom of the water tank 9 and any oil that finds its way into the water tank 9 floats to the water surface, only water is pumped up through the feedwater pipe 13. On the other hand, when oil is selected as the dielectric fluid, only the feed-oil pump 19 is rendered operative, the solenoid valves 21 and 26 are opened, and the solenoid valves 16 and 25 are closed, so that only the oil is fed into the working tank 3 through the feed pipe 17 and the dielectric fluid in the working tank 3 can be drained into the oil tank 11 through the drain pipe 22 and the oil-return pipe 24. Since the end of the feed-oil pipe 18 is positioned only slightly under the oil surface in the oil tank 11 and any water that finds its way into the oil tank 11 settles to the bottom of the oil tank 11, only oil is pumped up through the feed-oil pipe 18.

Figure 2:
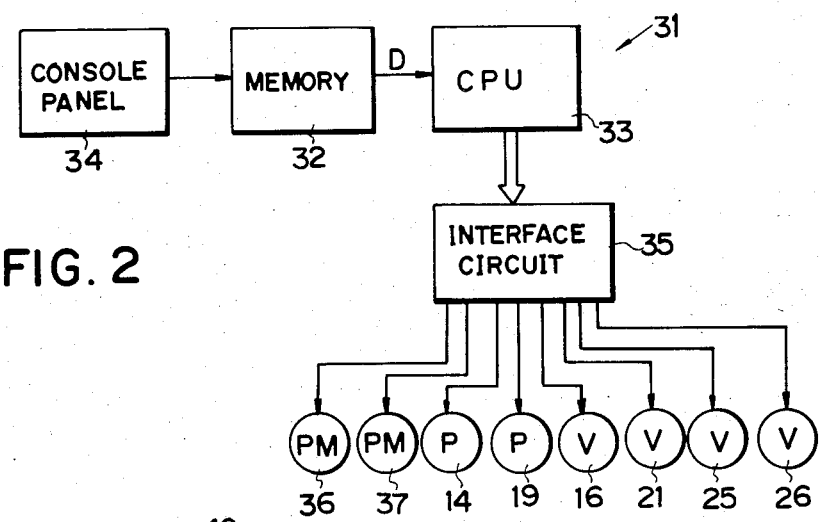
FIG. 2 is a block diagram of the control device for controlling the apparatus shown in FIG. 1.

The pumps 14 and 19 and the solenoid valves 16, 21, 25 and 26 are controlled by a control device 31 shown in FIG. 2. The control device 31 is mainly composed of a memory 32 and a central processing unit (CPU) 33. Desired working procedures and conditions are stored in the memory 32 using a console panel 34 and the operation is automatically carried out under the control of the CPU 33 in accordance with the contents of the memory 32. More specifically, a stepping motor 36 for moving the working table 7 in the X direction, a stepping motor 37 for moving the working table 7 in the Y direction, the pumps (P) 14 and 19 and the solenoid valves (V) 16, 21, 25 and 26, are operated in a predetermined order by an interface circuit 35 in accordance with the data D read out from the memory 32 by the CPU 33.

Figure 3:
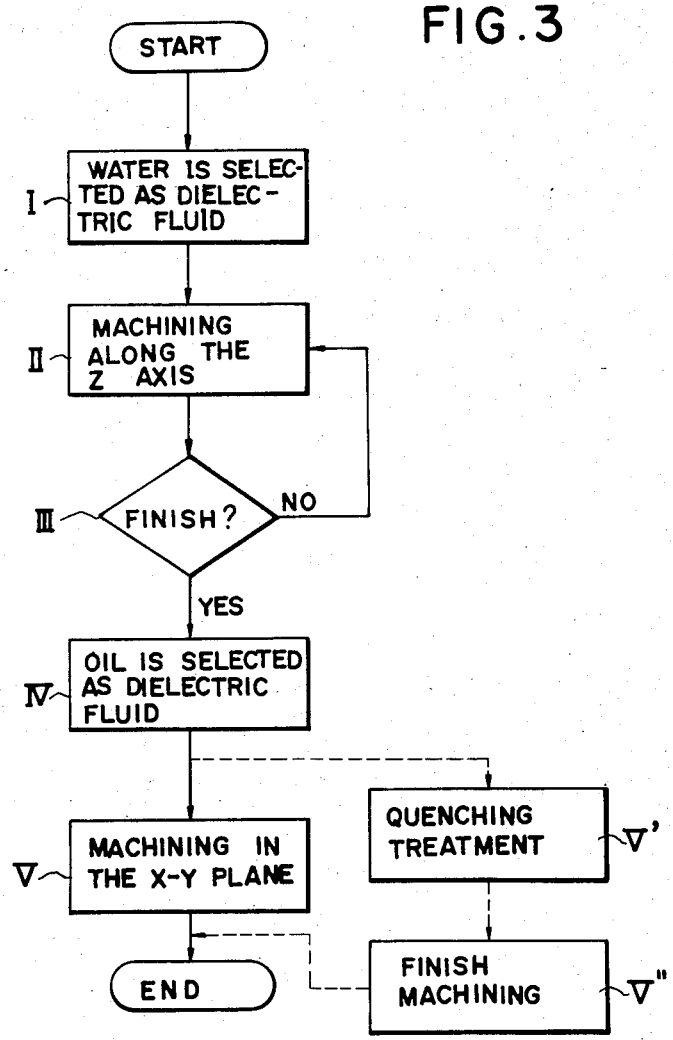
FIG. 3 is a flowchart showing a program for the control device shown in FIG. 2.

FIG. 3 is a flowchart showing a program for the control device 31. At first, when a start button (not shown) is depressed, the solenoid valves 16 and 25 are opened and the pump 14 is rendered operative, so that water is fed as the dielectric fluid into the working tank 3 (step I). In this case, as described above, the solenoid valves 21 and 26 are closed and the pump 19 is inoperative. When the water in the water tank 9 starts to be fed into the working tank 3, the tool electrode 5 is moved toward the workpiece 8 to start the machining in the Z direction. In this step, rough-machining using water as the dielectric fluid is carried out at a high working speed (step II). When this high speed rough-machining in the Z direction is finished (step III), oil is selected as the dielectric fluid instead of water (step IV). That is, after the operation of the pump 14 stops and all of the water in the working tank 3 is returned to the water tank 9, the solenoid valves 16 and 25 are closed, the solenoid valves 21 and 26 are opened, whereafter the pump 19 is rendered operative to feed oil as the dielectric fluid into the working tank 3 (step IV). After the dielectric fluid is changed from water to oil, the stepping motors 36 and 37 are driven to produce a predetermine relative motion in the X-Y plane between the workpiece 8 and the tool electrode 5 so as to perform the finish-machining (step V). Preferably, the relative motion in the X-Y plane is a motion of displacement in a plurality of directions in the X-Y plane. Since such a method for finish-machining is well known (e.g., U.S. Pat. No. 3,433,919) a detailed description thereof is omitted. The workpiece 8 is precisely machined in size by the above-mentioned finish-machining using oil as the dielectric fluid and particularly, the size of the corner portion of the workpiece 8 can be machined with high accuracy.

Figure 4:
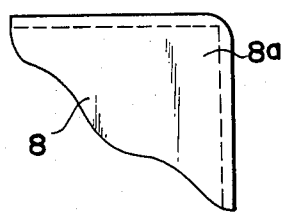
FIG. 4 is a diagrammatic plan view of a part of a workpiece.

That is, as illustrated in FIG. 4, when the corner portion 8a of the workpiece 8 is subjected to electric discharge machining using water as the dielectric fluid, the corner portion 8a is machined from both side faces since the water is electrolyzed, so that a rounded corner portion 8a is machined as shown by a solid line. On the other hand, when oil is employed as the dielectric fluid, since no electrolytic action occurs, the corner portion 8a can be precisely machined only by a discharge in the gap between the electrode 5 and the workpiece 8 to obtain the configuration as shown by a broken line in FIG. 4.

This method of electric discharge machining of the present invention has an advantage in that the electric discharge machining can be precisely carried out at a high working speed since the electric discharge machining for precise finish-machining is carried out by the use of oil as the dielectric fluid after a high speed electric discharge machining has been carried out as a rough-machining step using water as the dielectric fluid.

Although the step V is used as a fininsh-machining step in the example shown in FIG. 3, instead of the step V, a step V' of quenching the working surface of the workpiece by electric discharge machining using oil as the dielectric fluid and a step V" of final finish-machining in which water is employed again as the dielectric fluid for electric discharge machining may be provided. In the step V", the electric discharge machining is carried out for removing the quenched surface formed in the step V' (that is, the machined surface) to a depth corresponding to the roughness of the quenched surface. In this way, the roughness of the surface of the workpiece is reduced to the desired degree to obtain a final product. According to this method, the softening of the surface caused by rust produced on the surface of the workpiece when water is used as the dielectric fluid can be prevented to obtain a machined surface with good durability.

The foregoing explanation relates to a case wherein the apparatus shown in FIG. 1 is operated by the control device. However, the apparatus may, of course, be manually operated by an operator in a similar way to the operation described above.

Figure 5:
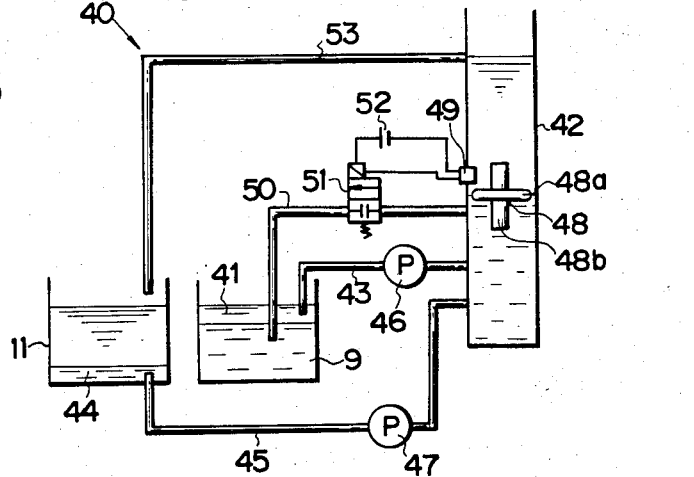
FIG. 5 is a schematic view of an embodiment of a dielectric fluid separator for use in the apparatus in FIG. 1.

FIG. 5 shows a dielectric fluid separator 40 suitable for use in the apparatus shown in FIG. 1. The dielectric fluid separator 40 is an apparatus for separating and taking out the oil mixed into the water tank 9 and the water mixed into the oil tank 11 and for returning them to the oil tank 11 and the water tnak 9, respectively. The separator 40 has an oil path 43 for use in returning oil 41 floating on the water surface of the water tank 9 to a separating tank 42 and a water path 45 for use in returning water 44 deposited at the bottom of the oil tank 11 to the separating tank 42. The oil path 43 and the water path 45 have pumps 46 and 47, respectively, and the oil and the water in the respective tanks are taken into the separating tank 42 at a relatively low speed. Consequently, water and oil are contained together in the separating tank 42. However, the water forms a lower layer and the oil forms a separate upper layer.

In order to detect the level of the boundary surface between the layer of water and the layer of oil, a detector 48 provided in the separating tank 42. The detector 48 has a specific weight which is greater than that of oil but less than that of water. To enable the detector 48 to move up and down in the separating tank 42 with a predetermined attitude in accordance with the change in the level of the boundary surface between water and oil, the detector 48 is composed of a disc member 48a with a diameter slightly smaller than the inside diameter of the separating tank 42 and a cylindrical member 48b coaxially coupled with the disc member 48a. A switch 49 is provided at an intermediate height on the side wall of the separating tank 42 and the switch 49 is operated in response to the upward/downward motion of the detector 48. A pipe 50 for returning the water is connected to the side wall of the separating tank 42 at a position slightly below the switch 49 and the pipe 50 is communicated with the water tank 9. The pipe 50 has a normally closed type solenoid valve 51 which is connected with a power source 52 to open when the detector 48 moves upward and the disc member 48a presses the switch 49. When the solenoid valve 51 is opened, the water which has separated from the oil and settled in the separating tank 42 is returned to the water tank 9 through the pipe 50. As a result, the level of the boundary surface is lowered, and at the same time, the detector 48 is moves downward to open the switch 49 and to close the solenoid valve 51 again. The operation described above is repeatedly carried out, and only the water in the separating tank 42 is returned to the water tank 9.

On the other hand, at the upper portion of the separating tank 42 above the switch 49, there is provided a pipe 53 for returning oil, which communicates the separating tank 42 with the oil tank 11, so that the oil which separates from the water and floats in the separating tank 42 can be returned to the oil tank 11 through the pipe 53 because of the difference between the level of the oil surfaces.

With this arrangement, the water and the oil contained in the oil tank 9 and the water tank 11, respectively, are separated into the respective tanks due to the difference between their specific weights, and the separated oil and the separated water are gradually transferred to the separating tank 42 in which the water is also separated from the oil to form the upper oil layer and the lower water layer. Therefore, there is no problem even if the water transferred from the oil tank 11 contains a little oil and/or the oil transferred from the water tank 9 contains a little water. When it is detected by the detector 48 that the level of the boundary surface is higher than a predetermined level nearly equal to the level of the switch 49, the solenoid valve 51 is opened so that the water is returned into the water tank 9. The solenoid valve 51 is not opened so long as the level of the boundary surface is not higher than the level of the opening of the pipe 50 on the separating tank side, so that only the water separated from the oil in the separating tank 42 is returned to the water tank 9. On the other hand, the oil separated from the water in the separating tank 42 is returned into the oil tank 11 through the pipe 53. Since the level of the boundary surface is limited by the operation of the detector 48 so as not to rise above the height of the switch 49, only oil is returned to the oil tank.

Although the description has been made in connection with one embodiment shown in FIG. 1, the present invention is not limited to this embodiment. For example, the present invention can also be applied to a wirecut electric discharge machine simply by replacing the electric discharge machine 2 with a wire-cut electric discharge machine.

Figure 6:
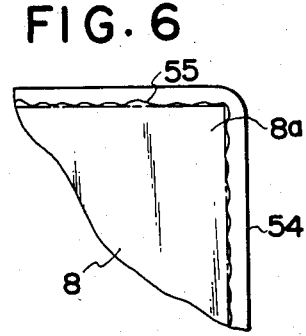
FIG. 6 is a diagrammatic plan view of a part of a workpiece.

In this case, water is first fed to the machine from the dielectric fluid feeding apparatus 4 to machine the workpiece by high speed electric discharge machining. This produces the profile 54 shown in FIG. 6. As will be seen from FIG. 6, the corner portion 8a is not sharpen due to the electrolytic action. After this, oil is selected as the dielectric fluid instead of water, higher accuracy machining is carried out, and the surface is quenched by electric discharge machining. As a result, the outline of the workpiece is changed to the profile 55 of FIG. 6. Next, water is selected as the dielectric fluid again and finish-machining is carried out to remove the surface of the work-piece to a depth corresponding to the roughness of the machined surface. The roughness of the profile 55 of the workpiece 8 in FIG. 6 is exaggerated and the desired profile is shown by a chain line.

Figure 7:
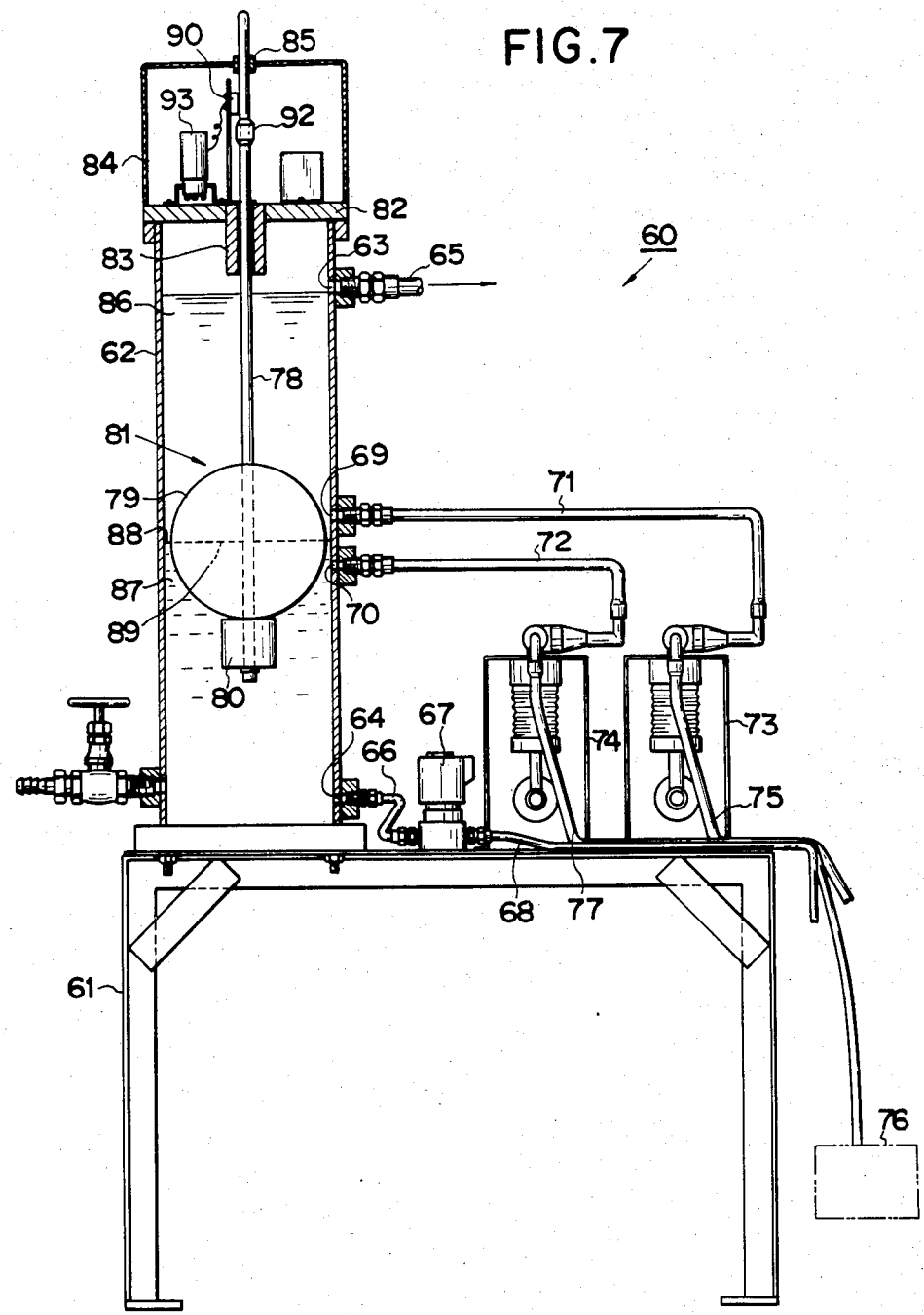
FIG. 7 is a fragmentary sectional view of another embodiment of a dielectric fluid separator.

In FIG. 7, another embodiment of the dielectric fluid separator is shown. The operating principle of the dielectric fluid separator 60 is the same as that of the separator 40 shown in FIG. 5, and the dielectric fluid separator 60 has a separating tank 62 fixed on a base 61. Drain ports 63 and 64 are formed at an upper portion and an lower portion of circumferential wall of the separating tank 62, the drain port 63 being connected with the oil tank 11 through a pipe 65 and the drain port 64 being connected with the water tank 9 through a pipe 66, a solenoid valve 67 and a pipe 68. Two inlet ports 69 and 70 are provided at an intermediate portion of the circumferential wall of the separating tank 62 and are connected with vane pumps 73 and 74 through pipes 71 and 72, respectively. The vane pump 73 is connected with one end of a pipe 75 the end of which extends to near the bottom of the oil tank 11, and the water deposited near the bottom of the oil tank 11 is pumped up through the pipe 75 and passed into the separating tank 62 from the inlet port 69. On the other hand, the vane pump 74 is connected with one end of a pipe 77 the other end of which is connected with an oil-removing device 76 for ladling the oil floating on the water surface of the water tank 9. The oil ladled by the oil-removing device 76 is pumped up through the pipe 77 and passed into the separating tank 62 from the inlet port 70.

The separating tank 62 has a float assembly 81 having a float 79 and a weight 80 which are secured to a rod 78 therein. The rod 78 is guided by a guide sleeve 83 fixed on a cover 82 of the separating tank 62 and another guide sleeve 85 secured to a case 84 fixed on the cover 82, so as to be movable in the vertical direction. The specific weight of the float assembly 81 is selected in such a way that the level of the boundary surface 88 between an oil layer 86 and a water layer 87 formed in the separating tank 62 is coincident with the equator 89 of the float 79. As a result, the float assembly 81 will be moved in the perpendicular direction in accordance with the change in the level of the boundary surface 88.

In order to maintain the level of the boundary surface 88 between the levels of the inlet ports 69 and 70, there is provided a limit switch 90 for detecting the level of the boundary surface 88. The limit switch 90 is operated by an operating member 92 secured to the rod 78. The mounting position of the operating member 92 is determined in such a way that the limit switch 92 is turned ON when the level of the boundary surface 88, that is, the level of the equator 89 reaches a position slightly below the level of the inlet port 69. A relay 93 for controlling the opening/closing the solenoid valve 67 is turned ON/OFF by the limit switch 90, and the solenoid valve 67 is opened so that the water forming the layer 87 drains from the separating tank 62 when the limit switch 90 is turned ON. As a result, the level of the boundary surface 88 lowers and the floating assembly 81 descends. However, due to the hysteresis characteristics of the limit switch 90 upon being turned ON and OFF, the limit switch 90 is not turned OFF immediately but is turned OFF after the floating assembly has descended by a predetermined distance. The height of the inlet port 70 is determined taking the hysteresis stroke of the switch 90 into consideration, and is set below the level of the boundary surface 88 at the time the limit switch 90 is switched over from ON to OFF.

As described above, the floating assembly 81 ascends and descends in accordance with the amount of the water in the separating tank 62, and the solenoid valve 67 is opened to lower the level of the boundary surface 88 when the boundary surface 88 comes close to the level of the inlet port 69. As a result, the level of the boundary surface 88 is always maintained between the inlet ports 69 and 70. Consequently, the oil from the inlet port 69 is always passed into the oil layer 86 and the water from the inlet 70 is always passed into the water layer 87. As a result, the separation of the oil and the water in the separating tank 62 is effectively carried out at high speed. In addition, similarly as in the embodiment of FIG. 5, the oil of the oil layer 86 drains from the drain port 63 in accordance with the change in the level of the liquid surface in the separating tank 62.

Figure 8:
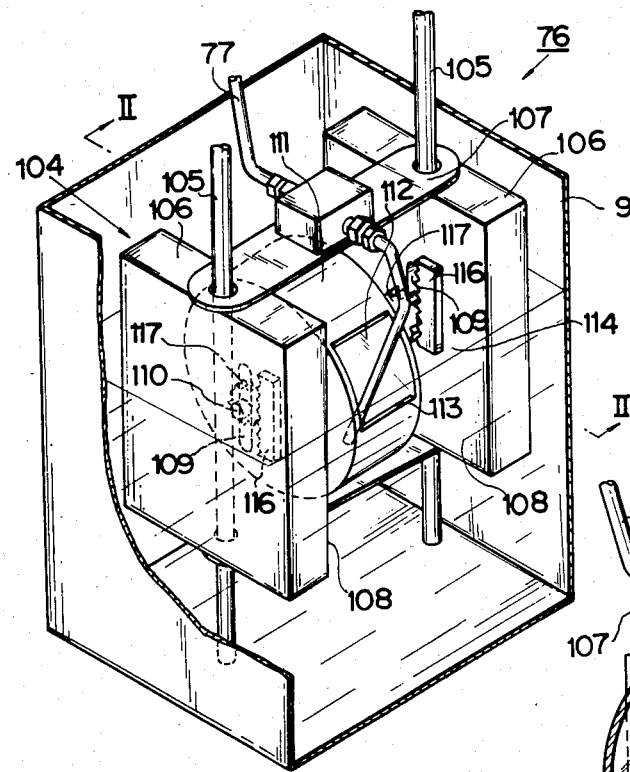
FIG. 8 is a perspective view of a device for removing oil floating on the surface of water in a water tank.
Figure 9:
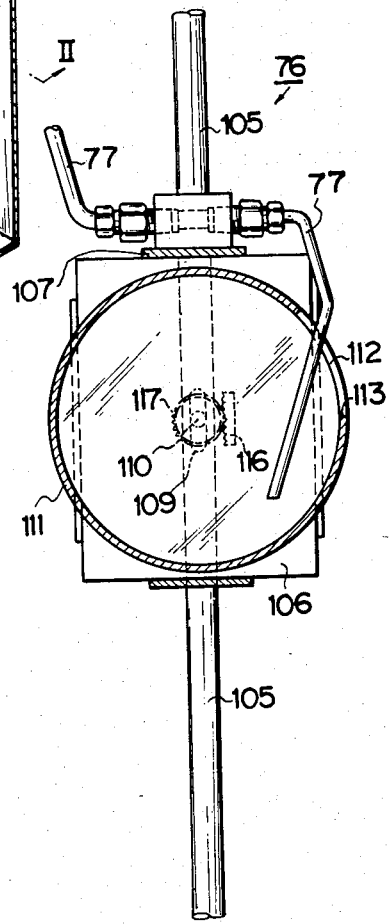
FIG. 9 is an enlarged cross-section of an important portion of the device, taken along the line II—II of FIG. 8.

In FIGS. 8 and 9, the oil-removing device 76 is shown in more detail. Oil that has got into the water tank 9 floats on the surface of the water. For the purpose of removing this layer of oil from the surface of the water, an oil-removing device 76 is provided in the water tank 9. The oil-removing device 76 is comprised of: a pair of spaced vertical guide rods 105, 105 standing from the bottom of the water tank 9; two floats 106, 106 mounted on the vertical guide rods 105, 105 so as to be vertically movable along the guide rods 105, 105, the floats floating in the water within the water tank 9; a connecting plate 107 mounted to connect the tops of the floats 106, 106; an oil container box 111 having an opening 112 through which oil is drawn from the water surface into the box, the oil container box 111 being mounted on a horizontal shaft 110 having its ends slidably and turnably inserted in vertically elongated holes 109, 109 formed in the inward faces 108, 108 of the two floats 106, 106, and; a self-adjusting mechanism 114 which serves to adjust the position of the opening 112 of the oil container box 111 so that a lower lip 113 of the opening 112 is always in contact with the oil layer floating on the water surface within the water tank 9. The self-adjusting mechanism 114 is comprised of racks 116, 116 attached to the faces 108, 108 of the floats 106, 106, and pinions 117, 117 attached one adjacent to each end of the horizontal shaft 110 and being engaged with the racks 116, 116. A pipe 11 provided for pumping out the oil taken into the oil container box 111 has one end immersed in the oil within the oil container box 111 and the other end connected to the pump 74. The oil container box 111 is preferably formed as a hollow cylindrical box as will be best understood from FIG. 9.

The operation of the oil-removing device will now be described.

The two floats 106, 106 floating in the water within the water tank 9 are connected together by means of the connecting plate 107. Therefore, as the level of the water within the tank 9 changes the floats 106, 106 move up and down along the guide rods 105, 105. The oil container box 111 also floats in the water, and since the opening 112 of the oil container box 111 is provided so that the lower lip 113 of the opening 112 is disposed adjacent to or in contact with the oil layer floating on the water surface, the oil of the oil layer gradually flows into the container box 111 by passing over the lower lip 113. As a result, the oil of the oil layer is gradually removed from the water surface. The oil flowing into the oil container box 111 gradually increases the weight of said box, and thus the oil container box 111 gradually descends in the water. Accordingly, the ends of the horizontal shaft 110 on which the oil container box 111 is mounted move down in the vertically elongated holes 109, 109. This descent of the horizontal shaft 110 causes it to rotate about its own axis since the pinions 117, 117 on the shaft 110 are caused to travel along the racks 116, 116 attached to the floats 116, 116. As a result, the oil container box 111 mounted on the shaft 110 is also slowly turned around the axis of the shaft 110. Consequently, the opening 112 is directed upwardly so that the lip 113 comes adjacent to the oil layer. That is, as the oil container box 111 becomes filled with oil and descends into the water, the oil container box 111 is concurrently caused to turn so that the lower lip 113 of the opening 112 of the oil container box 111 is automatically turned upward until the lip 113 again re-contacts the oil layer on the water surface. As a result, the oil contrainer box 111 always operates so as to remove the oil from the water surface.

On the other hand, when the oil in the oil container box 111 is pumped out through the pipe 77, the weight of the oil container box 111 is decreased, and the box 111 gradually ascends within the water. At this stage, the oil container box 111 together with the horizontal shaft 110 turn in the direction opposite to that in the case of the above-mentioned descent of the oil container box 111.

Therefore, the lower lip 113 of the opening 112 of the oil container box 111 always keeps its contact with the oil layer floating on the water surface. Accordingly, the oil always flows into the oil container box 111, and the oil on the water surface is removed.

From the foregoing, it will be understood that the oil-removing device 76 is always capable of removing the oil floating on the water surface by automatically adjusting the position of the opening of the oil container box 111 so long as oil remains on the water surface, even if the amount of water within the water tank 9 changes.

I claim:

1. A method of electric discharge machining which is carried out as a dielectric fluid is supplied to a machining gap between a workpiece and a tool electrode, said method comprising,
    rough machining said workpiece at high speed using water as the dielectric fluid,
    changing the dielectric fluid to oil after said rough machining,
    quenching the working surface of the workpiece by electric discharge machining using oil as the dielectric fluid thereby forming a quenched surface,
    changing the dielectric fluid to water after said quenching, and
    finish machining said workpiece, thereby removing the quenched surface.

2. A method as claimed in claim 1 in which said workpiece is moved in a predetermined manner relative to said tool electrode in a plane perpendicular to the direction of relative motion of said tool electrode toward said workpiece.

3. A method as claimed in claim 2 in which said workpiece is relatively moved by predetermined distances in a plurality of directions in said plane.

4. A method as claimed in claim 1 in which said water and said oil are selectively supplied to said machining gap by a dielectric fluid feeding device.

5. An apparatus for electric discharge machining in which electric discharge machining is carried out as a dielectric fluid is fed to a machining gap between a workpiece and a tool electrode, comprising:
    a feed-oil system having an oil tank;
    a feed-water system having a water tank;
    a feeding means for selectively feeding water or oil as the dielectric fluid to said machining gap by selecting said feed-water system or said feed-oil system; and
    means for returning the dielectric fluid used in said machining gap to the corresponding tank and
    a dielectric fluid recovery device for separating and recovering the dielectric fluid, wherein said dielectric fluid recovery device comprises a separate tank for separating the oil and the water into an upper layer and a lower layer, a first feeding means for sending the fluid near the bottom of said dielectric fluid in said oil tank to said separating tank, a second feeding means for sending the fluid at near the surface of said dielectric fluid in said water tank to said separating tank, the second feeding means including an oil-removing device for removing the oil floating on the surface of the water in the water tank, and means for recovering the oil and the water by separation in said separating tank and returning them to said oil tank and said water tank respectively.

6. An apparatus as claimed in claim 5 in which said returning means is a directional control means with a solenoid valve.

7. An apparatus as claimed in claim 5 in which said recovering means has a first path connected between a first point on said separating tank and said water tank, a second path connected between a second point on said separating tank and said oil tank, said second point being higher than said first point, a valve provided in said first path, a detector provided in said separating tank which moves upward and downward in accordance with the change in the level of the boundary surface between said upper layer and said lower layer, the detector being a float whose specific weight is greater than that of the oil but less than that of water, and means for opening said valve when said detector moves up to at least the level of said first point.

8. An apparatus as claimed in claim 7 in which the level at which water is fed to said separating tank by said first feeding means is lower than the level at which oil is fed to said separating tank by said second feeding means.

9. An apparatus as claimed in claim 8 in which said valve is controlled in such a way that the level of the boundary surface is always between said two levels.

10. The apparatus of claim 7 wherein the float is buoyant at a boundary surface between the oil and water, the float comprising a detector which coacts with a switch to open a solenoid valve thereby allowing water to be returned to the water tank.

* * * * *